(12) United States Patent
Reasoner et al.

(10) Patent No.: US 6,523,749 B2
(45) Date of Patent: Feb. 25, 2003

(54) APPARATUS AND METHOD FOR RETRIEVING DATA CARTRIDGE INFORMATION EXTERNAL TO A MEDIA STORAGE SYSTEM

(75) Inventors: Kelly J Reasoner, Ft Collins, CO (US); Kristianne E Johnson, Fort Collins, CO (US)

(73) Assignee: Hewlett-Packard Company, Fort Collins, CO (US)

( * ) Notice: Subject to any disclaimer, the term of this patent is extended or adjusted under 35 U.S.C. 154(b) by 24 days.

(21) Appl. No.: 09/800,248

(22) Filed: Mar. 6, 2001

(65) Prior Publication Data

US 2002/0125321 A1 Sep. 12, 2002

(51) Int. Cl.$^7$ .................................................. G06K 7/10
(52) U.S. Cl. ............................. 235/462.25; 235/462.01
(58) Field of Search ................................ 235/487, 375, 235/383, 381, 492, 441, 493, 462, 472; 710/74

(56) References Cited

U.S. PATENT DOCUMENTS

| | | | | |
|---|---|---|---|---|
| 5,424,526 A | * | 6/1995 | Leonhardt et al. | 235/487 |
| 5,508,783 A | * | 4/1996 | Iwagaki et al. | 355/40 |
| 5,568,455 A | | 10/1996 | Balsom | |
| 5,971,281 A | * | 10/1999 | Frary et al. | 235/487 |
| 6,025,972 A | | 2/2000 | Schmidtke et al. | 360/98.06 |
| 6,081,857 A | * | 6/2000 | Frary | 710/74 |
| 6,104,693 A | | 8/2000 | Coffin et al. | 369/178 |

FOREIGN PATENT DOCUMENTS

| | | | |
|---|---|---|---|
| EP | 1039410 A1 | | 9/2000 |
| JP | 404316028 A | * | 11/1992 |
| JP | 410293992 A | * | 11/1998 |
| WO | WO98/29826 | * | 7/1998 |
| WO | WO 99/64974 | | 12/1999 |
| WO | WO 00/10122 | | 2/2000 |

OTHER PUBLICATIONS

"Digital Paper Cartridge Volume Table Of Contents", NN94013, IMB Technical Disclosure Bulletin, Jan. 1994.*
RFID Basics Primer, internet article www.aimglobal.org/technologies/rfid/resources/papers/rfid_basics_primer.htm, printed Oct. 17, 2000, 8 pages.
RFID Transponders Will Enable Faster Back–up, Access and Restore Times for Tapes Storing up to 200 Gbytes of Computer Data, Hewlett–Packard/Philips Semiconductors Press Release, Sunnyvale, California, Nov. 1, 1999, 2 pages.
Transponder News: Electric transponder systems, internet article www.rapidttp.com/transponder/electric.html, printed Oct. 17, 2000, 2 pages.
Transponder News: Magnetic coupled transponder systems, internet article www.rapidttp.com/transponder/magnetic.html, printed Oct. 17, 2000, 2 pages.

* cited by examiner

Primary Examiner—Thien Minh Le (57) ABSTRACT

An apparatus and method for retrieving data cartridge information associated with a data cartridge while the data cartridge is external to a media storage system. An identification device containing the data cartridge information may be operatively associated with the data cartridge. A reader may be operatively associated with a media storage system in which the data cartridge is to be used. The reader is operable to read the data cartridge information contained on the identification device when the data cartridge is external to the media storage system.

18 Claims, 5 Drawing Sheets

APPARATUS AND METHOD FOR RETRIEVING DATA CARTRIDGE INFORMATION EXTERNAL TO A MEDIA STORAGE SYSTEM

FIELD OF THE INVENTION

The invention relates generally to media storage systems for handling and storing data cartridges, and more specifically, to systems for identifying the various data cartridges to be stored therein.

BACKGROUND OF THE INVENTION

Media storage systems are well-known in the art and are commonly used to store data cartridges at known locations and to retrieve desired data cartridges so that data may be written to or read from the data cartridges. Such media storage systems are often referred to as autochanger media storage systems or, simply, autochangers.

A typical autochanger or media storage system may include one or more different types of cartridge receiving devices for holding the various data cartridges. For example, one type of cartridge receiving device may comprise an individual cartridge storage location or slot (e.g., for holding a single data cartridge) or a cartridge storage rack or "magazine" (e.g., for holding a plurality of data cartridges). Another type of cartridge receiving device may comprise a cartridge read/write device for reading data from or writing data to the data cartridges contained in the autochanger. The cartridge storage slots or magazines serve to provide storage locations for the data cartridges and are commonly arranged so that they form one or more vertical stacks, although other arrangements are possible. The cartridge read/write device may be located at any convenient position within the media storage system.

The autochanger or media storage system may also be provided with a cartridge handling system for transporting the data cartridges between the various cartridge receiving devices, e.g., between the cartridge storage locations and the cartridge read/write devices. A typical cartridge handling system may include a cartridge engaging assembly or "picker" for engaging the various data cartridges contained in the cartridge receiving devices, as well as a positioning device for moving the cartridge engaging assembly among the various cartridge receiving devices.

Autochangers or media storage systems of the type described above are usually connected to a host computer system which may access or store data on the data cartridges. For example, if the host computer system issues a request for data contained on a particular data cartridge, a control system associated with the autochanger actuates the positioning system to move the cartridge engaging assembly or "picker" along the cartridge storage locations until the cartridge engaging assembly is positioned adjacent the desired data cartridge. The cartridge engaging assembly may then remove the data cartridge from the cartridge storage location and carry it to the cartridge read/write device. Once properly positioned adjacent the cartridge read/write device, the cartridge engaging assembly may insert the selected data cartridge into the cartridge read/write device so that the host computer may thereafter read data from or write data to the data cartridge. After the read/write operation is complete, the cartridge engaging assembly may remove the data cartridge from the cartridge read/write device and return it to the appropriate cartridge storage location.

Since most such media storage systems contain a large number of individual data cartridges, some means is usually provided to allow the media storage system to identify and locate the desired data cartridge. Most media storage systems utilize an "inventory map" which contains information relating to each data cartridge as well as its location within the media storage system. The media storage system utilizes the inventory map to move the various data cartridges within the media storage system to the proper locations and at the proper times.

One common means for generating and updating such an inventory map is to provide each data cartridge with an identification tag or label (e.g., a bar code label) that contains certain information relating to the data cartridge. By way of example, the data cartridge information may include data that uniquely identify the data cartridge as well as data relating to the type or classification of the data contained in the cartridge. The media storage device is provided with a suitable reading device (e.g., a bar code reader) which allows the data cartridge information to be read from the data cartridge once it has been loaded into the media storage system. The cartridge information for each cartridge, along with its corresponding storage location within the media storage system, is then used to generate and/or update the inventory map. Thus, when the media storage system is first placed into operation, the reading device provided within the media storage system will examine the tag or label provided on each data cartridge to ascertain its identity, then instruct the media storage system as to its location. This procedure is repeated for each individual cartridge. Once the data cartridges have been identified and inventoried, the media storage system may be placed into service.

It is often necessary or desirable for a system operator to periodically access one or more of the data cartridges contained within such a media storage system. For example, it may be necessary for the system operator to remove certain of the data cartridges from time to time if they become filled with data that is to be archived at another location. The system operator may then replace the filled data cartridges with blank data cartridges. In another situation, the system operator may desire to remove one or more of the data cartridges and replace it or them with a substitute data cartridge or cartridges containing different data.

Regardless of the reason for adding, removing, or replacing one or more of the data cartridges, the media storage system will need to re-inventory the data cartridges before it can be returned to operation. While the need to re-inventory the data cartridges may not be particularly burdensome in some cases, it can be particularly burdensome and/or time consuming if the data cartridges are exchanged frequently or if the media storage system contains a large number of data cartridges.

Another problem associated with currently available systems is that they can only identify the data cartridges after they have been loaded into the media storage system. This can be a problem in certain applications. For example, in applications utilizing a plurality of media storage systems, it is not uncommon for the systems to be divided based on data type or classification. That is, data cartridges containing a first data type or classification may be assigned to a first media storage system, whereas data cartridges containing a second data classification may be assigned to a second media storage system, and so on. If the system operator mistakenly inserts a data cartridge containing the second data type or classification into the first media storage system, the system operator may not become aware of the mistake until after the media storage system has completed the inventory operation. If such a mistake is made, the system operator will need to remove the improperly filed data cartridge from the first media storage system and load it into the correct system. Of course, the correct media storage system will then have to perform the inventory operation to properly catalog the newly loaded data cartridge.

SUMMARY OF THE INVENTION

Apparatus for retrieving data cartridge information associated with a data cartridge according to one embodiment of the invention may comprise an identification device operatively associated with the data cartridge. The identification device contains the data cartridge information. A reader is operatively associated with a media storage system in which the data cartridge is to be used. The reader is operable to read the data cartridge information contained on the identification device when the data cartridge is external to the media storage system.

Also disclosed is a method for retrieving data cartridge information associated with the data cartridge that may comprise the steps of: providing the data cartridge with an identification device containing the data cartridge information; positioning the data cartridge adjacent a reader operatively associated with a media storage system, the reader being operable to read the data cartridge information contained on the identification device when the data cartridge is external to the media storage system; and displaying at least a portion of the data cartridge information.

BRIEF DESCRIPTION OF THE DRAWINGS

Illustrative and presently preferred embodiments of the invention are illustrated in the drawings in which.

DESCRIPTION OF THE PREFERRED EMBODIMENT

Apparatus 10 for retrieving data cartridge information associated with a data cartridge 20 is shown and described herein as it could be used with a data or media storage system 15. Briefly, media storage systems 15 are used to store large volumes of computer readable data. The computer readable data is typically stored on multiple data cartridges 20 that are arranged in one or more cartridge receiving devices of the media storage system 15 (e.g., in storage magazines 30). The media storage system 15 may include a cartridge engaging assembly 40 that can be moved among the cartridge receiving devices and positioned adjacent a data cartridge 20 therein, according to an inventory map for accessing the data cartridges 20 stored therein. The inventory map must be updated each time a new data cartridge 20 is added and/or returned to the media storage system 15. It is therefore desirable to identify individual data cartridges 20 with as much information that is possible, while the data cartridge 20 is external to the media storage system 15, so that the data cartridge 20 may be loaded into the desired media storage system 15 at the desired position. The present invention relates to such a method and apparatus for reading the data cartridge information before the data cartridge 20 is loaded into the media storage system 15.

According to the teachings of the invention, the data cartridge 20 may be provided with an identification device 150 that contains data cartridge information. The data cartridge information may comprise a cartridge ID, user ID, data origin, access date(s), data format, load count, etc. However, as will be discussed below, greater or lesser amounts of information may be provided on the identification device 150. The apparatus 10 may also comprise a reader 140 operatively associated with the media storage system 15 so that the reader 140 is operable to read the data cartridge information contained on the identification device 150 when the data cartridge 20 is external to the media storage system 15. A display system 100 operatively associated with the reader may be mounted to the media storage system 15 so that a display panel 110 associated with the display system 100 is readily viewed by a system operator (not shown). The display system 100 displays at least a portion of the data cartridge information for the system operator.

The apparatus 10 may be operated as follows to allow the system operator to retrieve the data cartridge information while the data cartridge 20 is still external to the media storage system 15 (i.e., without having to load the data cartridge 20 into the media storage device 15). As a first step, the system operator provides the data cartridge 20 with the identification device 150 containing the data cartridge information. The data cartridge 20 may then be positioned adjacent a reader 140 operatively associated with the media storage system 15. The reader 140 is operable to read the data cartridge information stored on the identification device 150 when the data cartridge 20 is external to the media storage system 15. At least a portion of the data cartridge information may then be displayed for the system operator. As such, the system operator need not load the data cartridge 20 into the media storage device 15 to view the data cartridge information.

According to the invention, the data cartridge 20 can be identified external to the media storage system 15 without manual labeling thereof, and without using the cartridge engaging assembly 40 (e.g., the picker) and/or the read/write device 60. Thus, wear on these components is reduced as is the likelihood that the data cartridge 20 is loaded into the incorrect cartridge receiving device, or indeed, into the incorrect media storage system 15. In addition, the invention allows the inventory map to be updated upon loading the data cartridge 20 into the media storage system 15. Furthermore, the identification device 150 and the reader 140 are positionable adjacent one another without physically contacting one another. As such, the reader 140 and the identification device 150 are protected against physical wear. Also according to the invention, the identification device 150 can be rewritten and/or additional data cartridge information can be written thereto.

Having generally described a method and apparatus for retrieving the data cartridge information associated with a data cartridge 20 and several advantages thereof, several embodiments of the method and apparatus will now be described in further detail.

Figure 1:
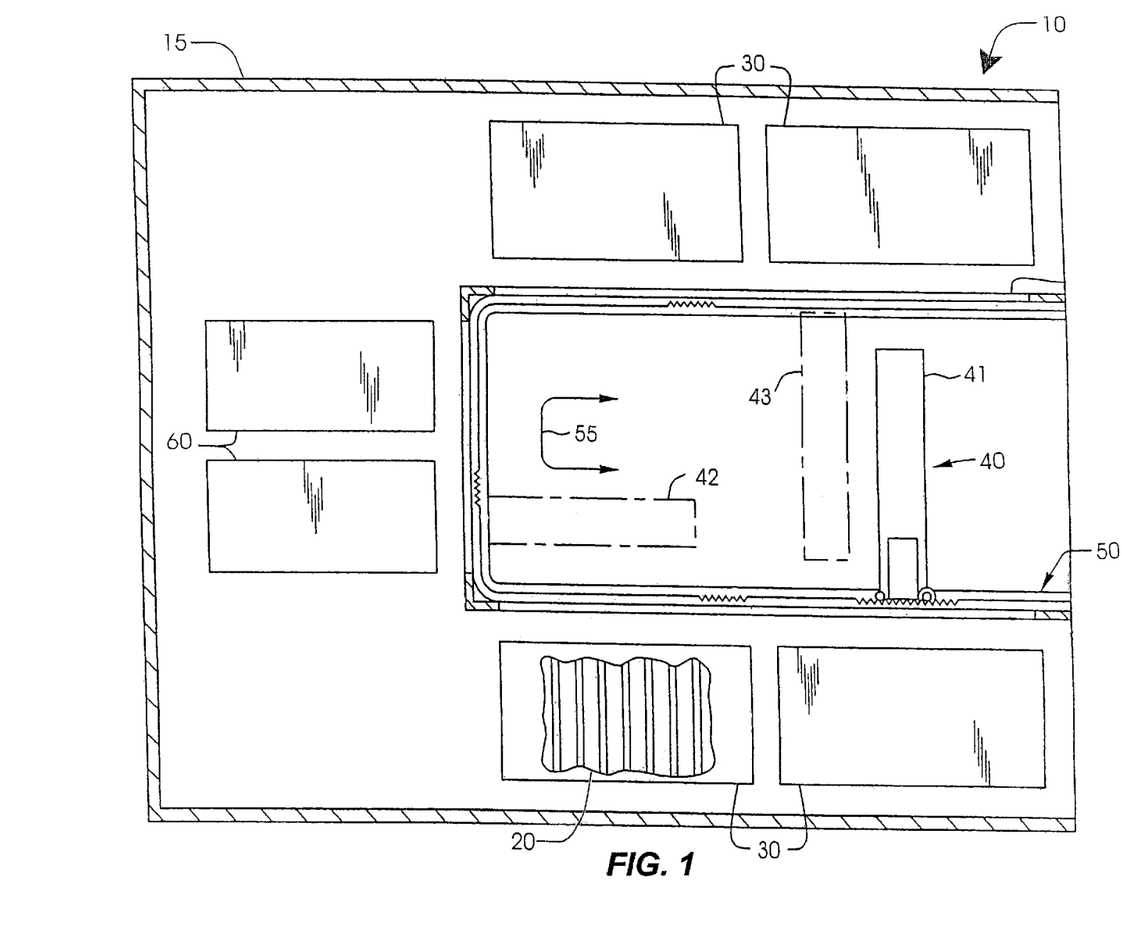
FIG. 1 is a plan view of a media storage system that utilizes the apparatus for retrieving data according to one embodiment of the invention.

The apparatus 10 for retrieving the data cartridge information associated with a data cartridge 20 may comprise an autochanger or media storage system 15 such that shown in FIG. 1. The media storage system 15 includes one or more data cartridges 20 arranged in one or more cartridge receiving devices (e.g., storage magazine 30, read/write device 60, a mail slot (not shown), etc.). In use, a control system (not shown) associated with the media storage system 15 moves a cartridge engaging assembly 40 (i.e., a "picker" and a positioning device) along a positioning rail 50 adjacent the cartridge receiving devices to access and deliver the data cartridges 20 according to requests by a host computer (not shown). That is, the host computer linked to the media storage system 15 (e.g., via a direct connection, remote connection, network connection, etc.) may issue a request to access a data cartridge 20 stored in one of the storage magazines 30 to read and/or write data thereto. In response, the control system moves the cartridge engaging assembly 40 along the positioning rail 50 (i.e., in the directions of arrow 55). The control system positions the cartridge engaging assembly 40 adjacent the requested data cartridge 20 (e.g., according to an inventory map). Once positioned, the control system signals the cartridge engaging assembly 40 to withdraw the data cartridge 20 from the storage magazine 30 and to carry it to the read/write device 60 where the linked computer can read and/or write computer readable data thereon.

In order to locate the data cartridge 20 within the media storage system 15, it may be desirable to load the data cartridge 20 in a predetermined media storage system 15 and/or a particular slot within a storage magazine 30 therein. For example, where the data cartridge 20 has been removed (e.g., for cleaning or otherwise), the data cartridge may need to be returned to the same location it was withdrawn from. Or for example, where the data cartridge 20 is of a particular type (e.g., backup data, video streams, from a particular department, etc.), the data cartridge 20 may need to be added to a particular media storage system or positioned therein so that it can be grouped with other related data cartridges 20. In addition, the inventory map must be maintained so that data cartridges 20 that have been added or removed from the media storage system 15 can be identified by the control system. Therefore, it is often desirable to identify the data cartridge 20 when it is external to the media storage system 15. According to the invention, the data cartridge 20 may be identified by data cartridge information (e.g., cartridge ID or serial number, user ID, data origin, access date(s), data format, load count, etc.) stored on an identification device 150 attached thereto. The data cartridge information can be read (i.e., using standard protocols) when the identification device 150 is positioned adjacent the reader 140 (e.g., mounted to the housing of the media storage system 15, using a handheld unit 130, etc.), as explained in more detail below.

Figure 2:
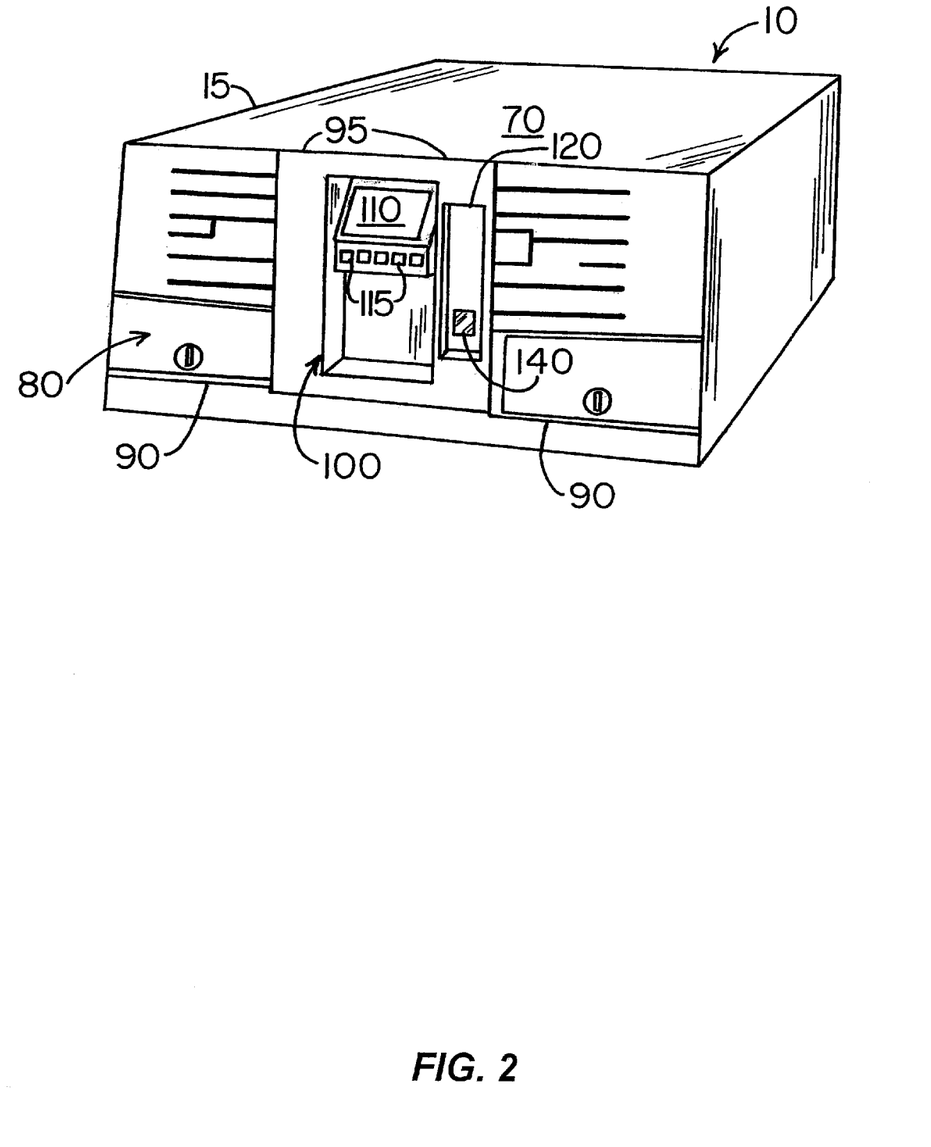
FIG. 2 is a perspective view of the media storage system showing one embodiment with a reader operatively associated therewith.

FIG. 2 is a perspective view of the media storage system 15 including a case or housing 70. The housing 70 may be provided to reduce the entry of dust and/or other foreign objects into the media storage system 15, for aesthetic reasons, for safety reasons, etc. In a preferred embodiment, the housing 70 includes an interface panel 80 and two drawers 90. The drawers 90 may slide within the housing 70 and allow access into the media storage system 15 (e.g., to the storage magazines 30). The interface panel 80 may also include a display system 100 having, for example, a display unit 110 and a keypad 115. The display system 100 may be provided for menu-driven information retrieval, diagnostics, etc. One or more columns 95 may be formed on the interface panel 80, for example, between the drawers 90 and the display system 100. In a preferred embodiment, the reader 140 is mounted to the media storage system 15. For example, the reader 140 may be mounted in a recess or recessed area 120 formed on the interface panel 80 (e.g., shown on one of the columns 95 thereof).

The recess 120 is preferably sized to receive at least a portion (e.g., the leading edge) of the data cartridge 20 therein. As such, the data cartridge 20 may be positioned within the recessed area 120 so that the reader 140 aligns with the identification device 150 on the data cartridge 20 (see FIG. 4). As such, the system operator can readily insert the data cartridge 20 into the recess 120 so that the reader 140 is within the transmission range of the identification device 150 (e.g., forming an air interface therebetween). Once the reader 140 is within the transmission range of identification device 150, the reader 140 activates the identification device 150 and triggers a response (i.e., a data signal containing the data cartridge information) from the identification device 150, as described in more detail below. As such, the data cartridge information (e.g., identity, data format, date, etc.) contained on the identification device 150 can be read and processed before the data cartridge 20 is loaded into the media storage system 15.

The housing 70 is preferably similar to that used for electronic equipment (e.g., personal computers, peripheral devices, stereo equipment, etc.). For example, the housing 70 may be made from plastic or any other suitable polymer, sheet metal, a combination thereof, etc. However, it is understood that the housing 70 can be manufactured from any suitable material. In addition, the housing 70 may include any suitable design. For example, the housing 70 may include only the interface panel 80. Alternatively, the housing may be omitted altogether.

It is understood that the display system 100 need not be affixed to the media storage system 15. For example, the display system 100 may be affixed to a nearby wall (not shown), or may be part of an administrator workstation (not shown), etc. Nor need the display system 100 include both the display unit 110 and the keypad 115.

Likewise, the reader 140 need not be affixed to the media storage system 15. For example, another embodiment of the invention is shown as apparatus 15' in FIG. 3. The apparatus 15' may also include a case or housing 70'. Again, the housing 70' may include an interface panel 80' and two drawers 90' to allow access into the media storage system 15'. The interface panel 80' may also include a display system 100' having, for example, a display unit 110' and a keypad 115'. One or more columns 95' may be formed on the interface panel 80' (e.g., between the drawers 90' and the display system 100'). Again, the reader 140 may be mounted to the media storage system 15. Alternatively, or in addition to, a hand-held housing portion 130 may be provided. The hand-held housing portion 130 is preferably sized to receive the reader 141 so that the reader 141 is movable by hand with respect to the data cartridge 20.

Figure 3:
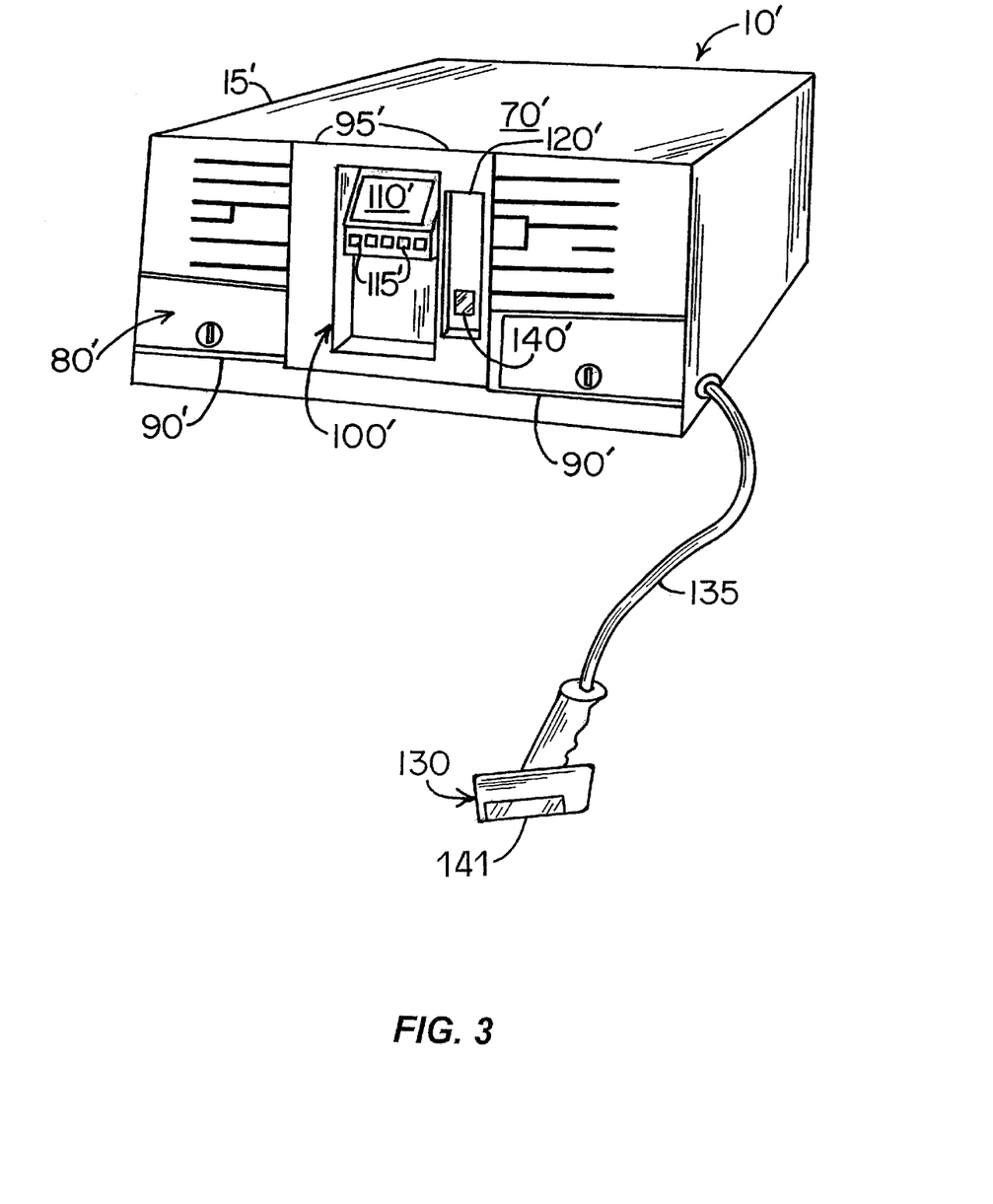
FIG. 3 is a perspective view of the media storage system showing another embodiment with the reader also embodied in a handheld unit.

It is understood that the handheld housing portion, or simply the hand-held unit 130, may be linked to the media storage system 15' using any suitable means. For example, the handheld unit 130 may be linked to the media storage system 15' directly via cable 135. Or for example, the handheld unit 130 may be linked to the media storage system 15' via a remote means (e.g., radio frequency (RF), infrared (IR), etc.). Alternatively, the handheld unit 130 may be a separate or independent unit from the media storage system 15'. As such, the data cartridge information from scanned data cartridges 20, data input by the system operator, etc., may be stored in suitable memory at the handheld unit 130 and transferred or downloaded to another device or computer linked or able to link to one or more of the media storage systems 15, 15'. Likewise, the handheld unit 130 may also comprise a display system of its own (not shown), data entry system of its own (not shown), etc.

It is further understood, that the identification device 150 and/or the reader 140 can be embedded in the data cartridge 20 and/or the housing 70 of the media storage system 15 (or handheld unit 130), respectively, or attached using any other suitable means (e.g., adhesive, integrally formed therein, etc.). As an illustration (see FIG. 4), the reader 140 is shown flush with the housing 70 within the recess 120 and the identification device 150 is shown protruding from the leading edge of the data cartridge 20. However, the reader 140 and/or the identification device 150 need not be mounted flush with the housing 70 and the data cartridge 20, respectively, and may instead protrude therefrom.

Figure 4:
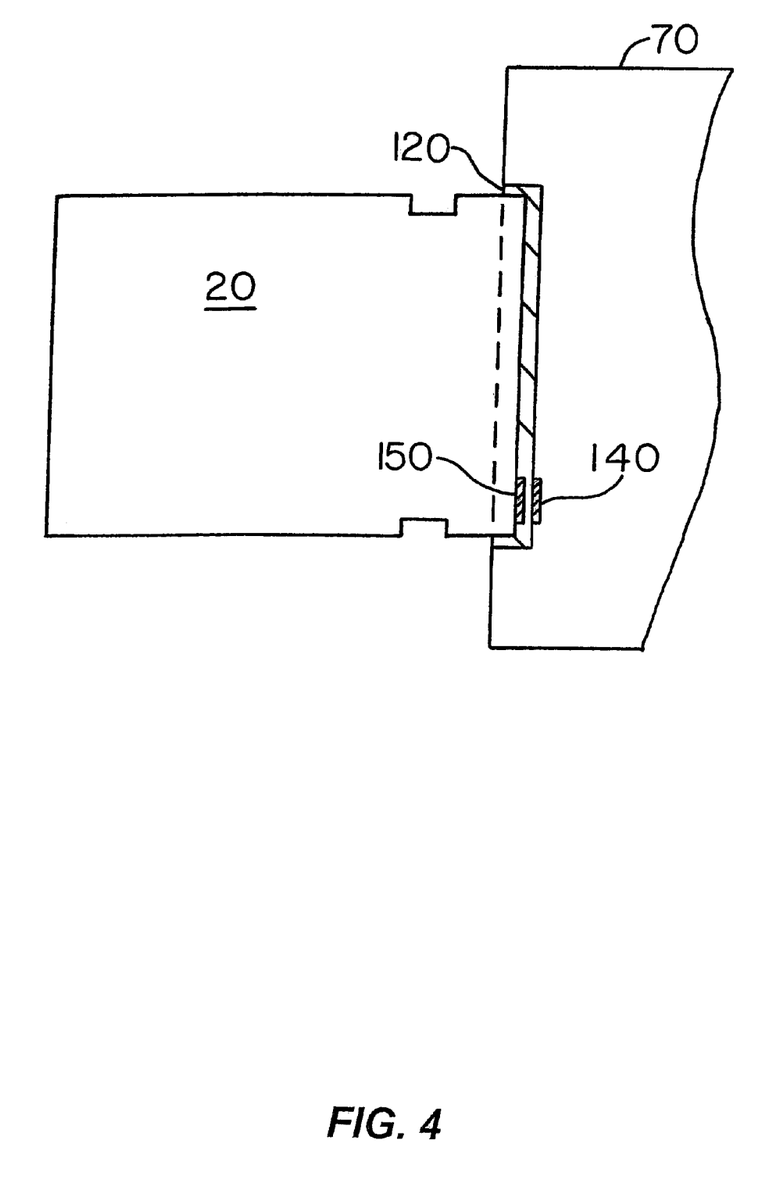
FIG. 4 is a simplified, partial cross-sectional view of the media storage system showing a data cartridge having an identification device thereon and positioned in close proximity to the reader.

FIG. 4 is a partial cross-sectional view of the media storage system 15 showing a data cartridge 20 having an identification device 150 mounted thereto and positioned in close proximity to the reader 140. The data cartridge 20 is preferably guided into the recess 120 formed in the housing 70 so that the identification device 150 is substantially aligned with the reader 140. However, as explained above, the identification device 150 can be read using the reader 140 otherwise attached to the media storage unit 15, or the remote reader 140 (e.g., the handheld unit 130).

Preferably the data cartridge information is transmitted from the identification device 150 to the reader 140 without the reader 140 and the identification device 150 physically contacting one another. The preferred transmission range is about three millimeters and serves to reduce or eliminate physical wear that may occur where the reader 140 and the identification device 150 are in repeated contact with one another. However, the invention is not to be limited to the preferred transmission range of three millimeters. In other embodiments, the reader 140 can come into contact with the identification device 150. Likewise, the transmission range can be greater than three millimeters. The transmission range may vary under the teachings of the present invention and may depend on design considerations such as the transmission and receiving capabilities of the reader 140 and the identification device 150, etc. Other design considerations may include the respective power requirements of the reader 140 and the identification device 150, the signal detection capability of the reader 140, the transmission frequencies, the rate of transmission, etc.

According to the various embodiments of the invention, the data cartridge information is read from the data cartridge 20 and displayed or otherwise processed so that the data cartridge 20 can be identified external to the media storage system 15. For example, the data cartridge information can be displayed (e.g., using display system 100) for a system operator to view. The display unit 110 may show top level information, such as the data cartridge identification and format, and the system operator can then page through additional data cartridge information (e.g., date created, used and unused capacity, originating department, etc.) using the keypad 115. Also for example, the data cartridge information can be processed by a controller 147 to update the inventory map for the media storage system 15.

As an illustration, the system operator may remove a data cartridge 20 from the media storage system 15. The data cartridge 20 can be positioned so that the reader 140 and the identification device 150 are adjacent one another (e.g., using recess 120 as a positioning guide). The data cartridge information is obtained by the reader 140 and top level information (e.g., serial number) may be displayed using display system 100 for the system operator to view it. The system operator may, for example, scroll through additional information using arrow keys on the keypad 115, or the like (e.g., a touch screen on display unit 110). Based on this information, the system operator may determine that the data cartridge 20 is to be removed from the media storage system 15. For example, the system operator may select a menu option, such as "Remove From Inventory" using keypad 115 or the like. Processing logic (e.g., the control system) then removes the data cartridge 20 from the inventory map based on the information stored on the identification device 50.

As another illustration, the system operator may have a data cartridge 20 that is to be added or returned to the media storage system 15. Again, the data cartridge 20 is positioned so that the reader 140 is adjacent the identification device 150 (e.g., in recess 120). The data cartridge information is obtained by the reader 140. Based on the data cartridge information, processing logic may determine that the data cartridge 20 is to be added to the media storage system 15 at a predetermined position therein. The processing logic may display the predetermined position for the system operator. The system operator may optionally change or otherwise edit the predetermined position or accept the predetermined position. In any event, the system operator may now insert the data cartridge 20 into the media storage system 15 at the desired or predetermined position. Once the system operator has added the data cartridge 20 to the media storage system at the predetermined position, the system operator may then select the menu option "Add To Inventory" using keypad 115. The processing logic may then update the inventory map to include the data cartridge 20 and its position in the media storage system 15.

In yet another illustration, the system operator may use the invention to determine where a data cartridge 20 should be loaded. For example, where there are separate media storage systems 15 for various types of data, the system operator may scan the data cartridge 20 (e.g., using handheld unit 130) and view the data cartridge information using display system 100. The system operator may scroll through the data cartridge information displayed on display unit 110 (e.g., using keypad 115) to determine the type of data stored on the data cartridge 20, or any other data cartridge information the system operator desired to view. Once the data cartridge 20 has been sufficiently identified, the system operator can add or return the data cartridge 20 to the desired media storage system 15.

It is understood that the above examples are merely illustrative of the invention and are not intended to limit the scope thereof. Other embodiments not illustrated are also contemplated as being within the scope of the invention.

The reader 140 and the identification device 150 preferably use radio frequency identification (RFID) technology. Generally, RFID transponders have small power requirements (e.g., in the microwatt to milliwatt range), and can be passive, active, or a combination thereof. That is, a passive RFID transponder derives power from a magnetic or electric field generated by the reader 140, while an active RFID transponder is self-powered by an internal battery. A combination passive/active RFID transponder is powered by an internal battery, but only draws power from the battery after being passed through a high energy activation field. RFID technology is well understood in the art. However, it is understood that the reader 140 and the identification device 150 are not limited to RFID technology and can include other storage and communication systems now known or later developed for storing and reading the data cartridge information.

Figure 5:
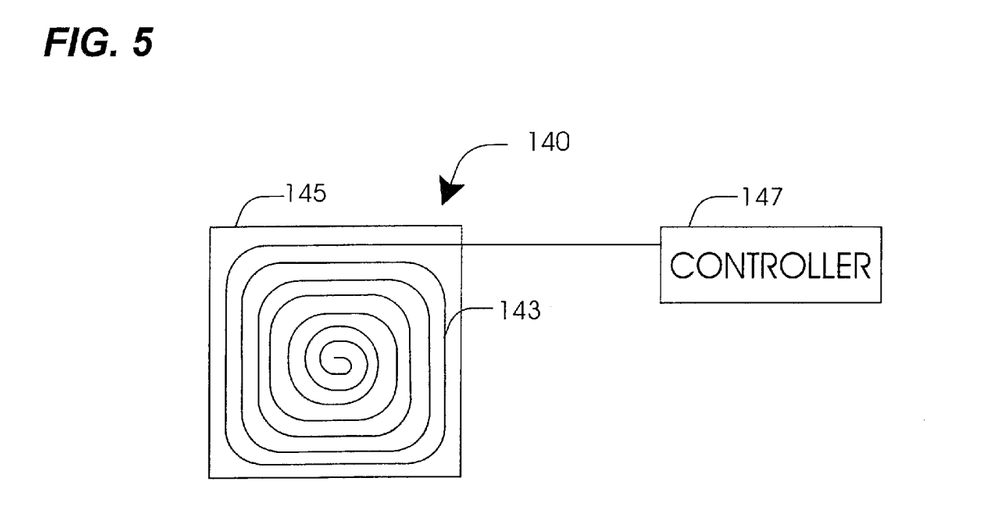
FIG. 5 is a plan view of an exemplary reader.

An exemplary reader 140 is shown in FIG. 5 and includes an antenna 143 (e.g., numerous turns of a fine wire to form a coil) etched on a flexible printed circuit substrate 145. The reader 140 is operatively associated with a controller 147. That is, the controller 147 is linked (via a direct or remote connection) with the reader 140 for communicating therebetween. For example, where the reader 140 is an inductive reader, the controller 147 may cause an electrical current to pass through the antenna 143, thus generating an energy field for activating the identification device 150. Once the identification device 150 is activated, the controller 147 may transmit an interrogation signal through the antenna 143 querying the identification device 150. Likewise, when the reader 140 receives a response or a data signal from the identification device 150, the data signal is delivered to the controller 147 for further processing. For example, the controller 147 may convert the data signal into user-readable data for output with the display system 100 or for a computer. Or for example, the controller 147 may generate or update an inventory map or database with the data cartridge information contained in the data signal. Although the controller 147 is shown separate from the circuit board 145, the reader 140 and the controller 147 can be fabricated together on a single circuit board (e.g., as an integrated circuit).

It is understood that the controller 147 and the reader 140 include any required circuitry and software or firmware for performing the functions described herein. The design of such controllers and readers is well known in the art. In addition, the controller 147 and the reader 140 can be used to perform any suitable functions, such as but not limited to, signal conditioning, parity error checking, correction, etc. Likewise, once the data signal is correctly received at the reader 140 from the identification device 150 and decoded at the controller 147, the controller 147 may instruct the identification device 150, through the reader 140, to cease transmitting. Where the identification device 150 is programmable, the controller 147 and reader 140 can also include circuitry to perform the necessary data modulation/demodulation and data transfer.

Figure 6:
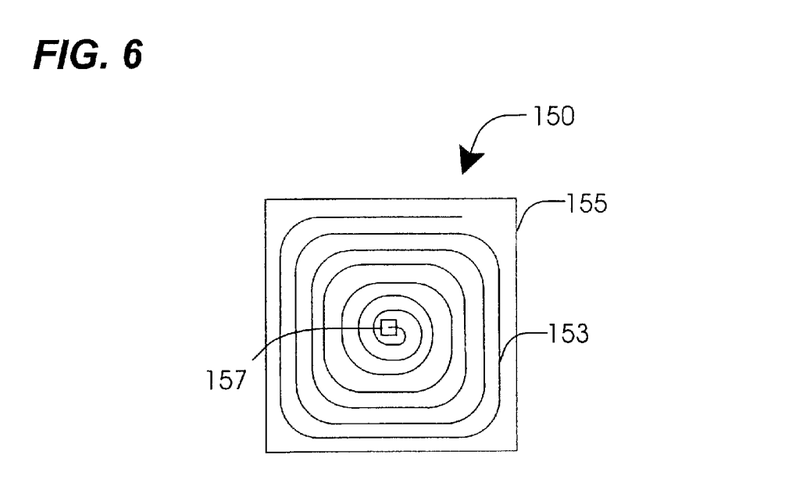
FIG. 6 is a plan view of an exemplary identification device.

An exemplary identification device 150 (e.g., an RFID transponder) is shown in FIG. 6. The identification device 150 preferably includes a low powered integrated circuit (IC) 157 and an antenna 153 (e.g., numerous turns of a fine wire to form a coil) etched on a flexible printed circuit substrate 155. The IC 157 preferably includes a processor (or processing logic) and at least one memory or memory system. The processor receives the query signal from the reader 140 at the antenna 153. The processor retrieves data stored on the memory or memory system and generates a response (i.e., an answer or data signal containing the data requested by the query). The data signal is transmitted via the antenna 153 on the identification device 150 (e.g., via radio frequency) and is received at the antenna 143 on the reader 140. While the identification device 150 is shown fabricated as a single printed circuit board, the identification device can comprise separate components linked to one another.

The identification device 150 can include any suitable memory. The memory may include Read Only Memory (ROM) for security data and operating system instructions, which in conjunction with the processor, controls internal functions (e.g., response delay timing, data flow control, and power supply switching). The memory may also include Random Access Memory (RAM) to facilitate temporary data storage during query and response. The memory may also include non-volatile programmable memory (e.g., Electrically Erasable Programmable Read Only Memory or EEPROM) to store the data cartridge information that is retained therein when the identification device 150 is deactivated or in a power-saving mode. The memory may also include write-once/read many (WORM) memory, wherein the reader 140 and/or controller 147 could be configured (or a separate writing device provided) to write data to the identification device 150 (e.g., an indication of when or how often the data cartridge 20 is accessed). Likewise, data buffers may be used to temporarily hold incoming data following demodulation and outgoing data for modulation and interface with the reader 140. In addition, data stored in memory on the identification device 150 can be conventionally organized using data identifiers and error detection bits (i.e., source encoding).

The identification device 150 preferably stores up to four kilobytes of data cartridge information. In one embodiment, the data cartridge information can be partitioned. For example, the data cartridge information may include device common information (e.g., remaining capacity, maximum capacity, tape alert flags, etc.), medium common attributes (e.g., manufacturer, serial number, etc.), and host common attributes (e.g., vendor, version, date last written, etc.). Likewise, the identification device 150 may include permanent data and rewritable data. However, it is understood that the quantity of data stored on the identification device 150 can vary depending on the design characteristics of the identification device 150, the type of data stored thereon, etc. It is also understood that the type of data that is stored on the identification device 150 is immaterial to the scope of the present invention.

It is understood that although the invention may be embodied by an RFID transponder and reader, that the reader 140 and the identification device 150 are not to be limited thereto. The reader 140 and the identification device 150 may be any suitable device. For example, the identification device 150 may be a bar code and the reader 140 may be a bar code reader. Other embodiments are also contemplated under the teachings of the invention. Indeed, the scope of the invention is intended to include readers 140 and identification devices 150 now known and those that may be developed in the future.

It should be noted that although the apparatus and method of the present invention is illustrated using a particular media storage system 15, the teachings of the invention may be utilized in any of a wide range of media storage systems now known in the art or that may be developed in the future. Accordingly, the present invention should not be regarded as limited to the particular media storage system 15 shown and described herein. It should also be noted that while the media storage system 15 is shown and described herein as it could be used to store and retrieve a linear tape open (LTO) data cartridge 20 having a standard size and configuration, it is not limited to any particular type or style of data cartridge. Indeed, the invention disclosed herein could be used with any type of storage medium (e.g., magnetic disk or tape, optical disk, etc.). Consequently, the present invention should not be regarded as limited to use with the media storage system 15 for the LTO data cartridge 20 shown and described herein.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. Apparatus for retrieving data cartridge information associated with a data cartridge, the data cartridge being useable in a media storage system, comprising:

an identification device operatively associated with the data cartridge, said identification device containing the data cartridge information;

a reader operatively associated with the media storage system, said reader being operable to read the data cartridge information contained on said identification device when the data cartridge is external to the media storage system; and a display system mounted to the media storage system and operatively associated with said reader, said display system displaying at least a portion of the data cartridge information.

2. The apparatus of claim 1, wherein said identification device comprises:

a memory system for holding the data cartridge information; and a transponder system operatively associated with said memory system, said transponder system generating an answer signal in response to a query signal produced by said reader, the answer signal comprising the data cartridge information.

3. The apparatus of claim 2, wherein said reader is mounted to the media storage system.

4. The apparatus of claim 2, wherein said transponder system comprises a radio frequency identification (RFID) transponder.

5. The apparatus of claim 1, wherein said identification device comprises a bar code and wherein said reader comprises a bar code reader.

6. The apparatus of claim 1, wherein said identification device is a passive transponder.

7. The apparatus of claim 1, further comprising an interface panel mounted to the media storage system, said interface panel defining a recessed area therein sized to receive at least a portion of the data cartridge and wherein said reader is positioned within said recessed area so that said reader is substantially aligned with said identification device on the data cartridge when the data cartridge is positioned in said recessed area.

8. The apparatus of claim 1, further comprising a handheld housing portion sized to receive said reader so that said reader is moveable by hand with respect to the identification device.

9. A system comprising, in combination:

a media storage system adapted to receive a data cartridge;

an identification device mounted to the data cartridge, said identification device containing data cartridge information;

a reader operatively associated with said media storage system, said reader being operable to read the data cartridge information contained on said identification device when the data cartridge is external to said media storage system; and a display system mounted to said media storage system, said display system being operatively associated with said reader to display at least a portion of the data cartridge information.

10. The system of claim 9, further comprising an interface panel mounted to said media storage system, said interface panel defining a recessed area therein sized to receive at least a portion of the data cartridge.

11. The system of claim 9, wherein said reader is mounted to said media storage system.

12. The system of claim 11, further comprising a handheld unit for said reader movable by hand with respect to said identification device.

13. Apparatus for retrieving data cartridge information associated with a data cartridge, the data cartridge being useable in a media storage system, comprising:

a cartridge identifier mounted to said data cartridge for containing the data cartridge information;

a reader mounted to the media storage system for reading the data cartridge information contained on said cartridge identifier when the data cartridge is external to the media storage system; and a display mounted to the media storage system for displaying at least some of the data cartridge information.

14. The apparatus of claim 13, further comprising a recessed area defined on said media storage system for receiving at least a portion of the data cartridge therein and for substantially aligning said reader with said cartridge identifier.

15. A method for retrieving data cartridge information associated with a data cartridge, the data cartridge being useable in a media storage system, comprising:

providing the data cartridge with an identification device containing the data cartridge information;

positioning the data cartridge adjacent a reader operatively associated with the media storage system, the reader being operable to read the data cartridge information contained on said identification device when the data cartridge is external to the media storage system; and displaying at least a portion of the data cartridge information on a display mounted to the media storage system.

16. The method of claim 15, further comprising writing at least a portion of said data cartridge information to said identification device.

17. The method of claim 15, further comprising querying the identification device provided on the data cartridge for the data cartridge information.

18. The method of claim 17, further comprising receiving an answer from the identification device, the answer containing the data cartridge information.

* * * * *